No. 807,184. PATENTED DEC. 12, 1905.
J. E. MALNBURG.
HOSE SUPPORT.
APPLICATION FILED FEB. 8, 1905.
2 SHEETS—SHEET 1.
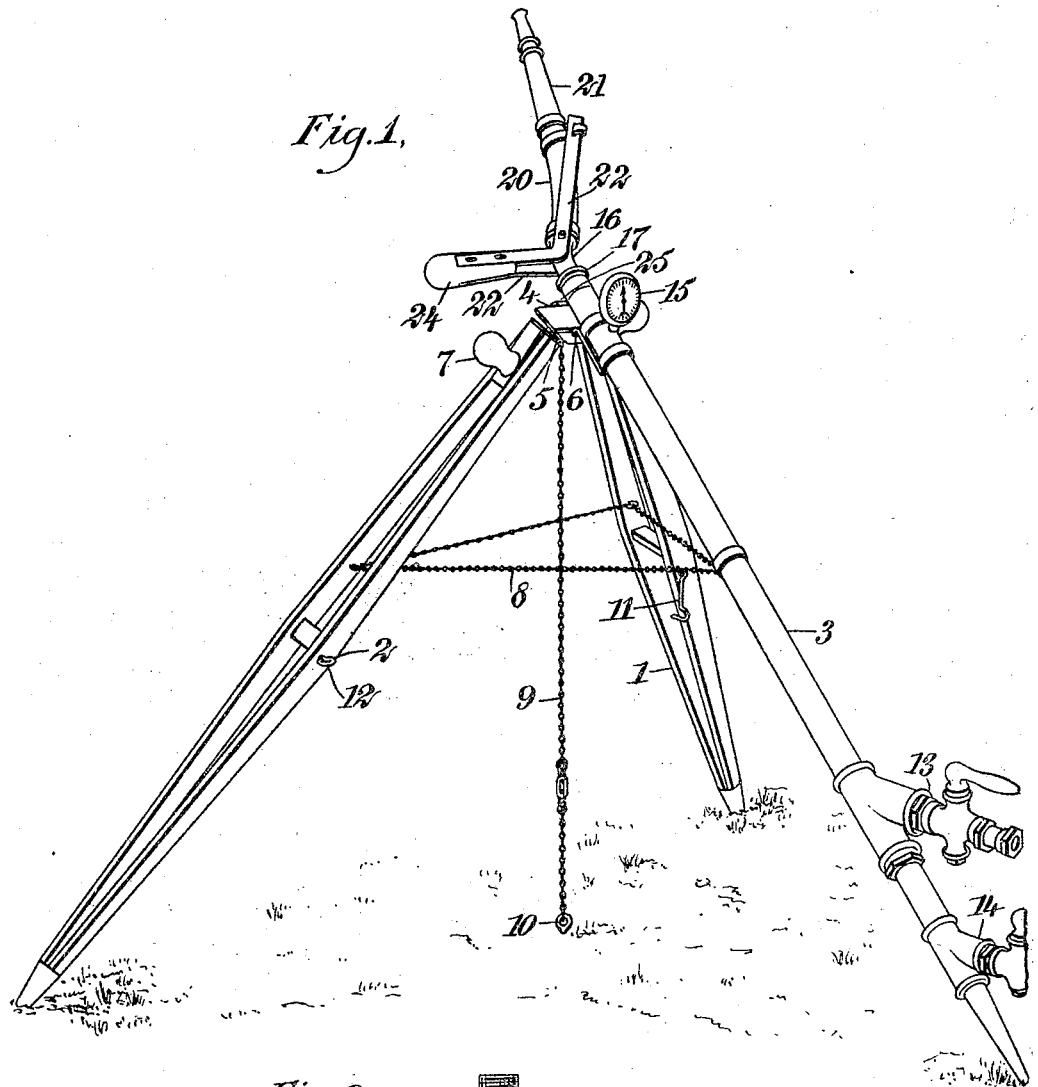
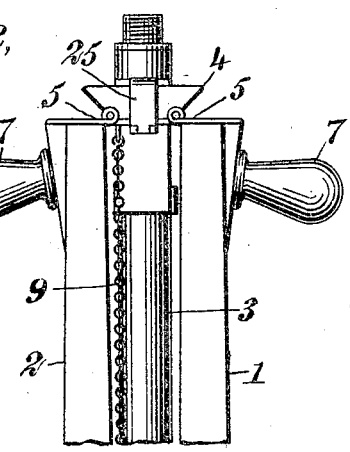
WITNESSES:
Edward Thorpe
C. R. Ferguson
INVENTOR
John E. Malnburg
BY
ATTORNEYS

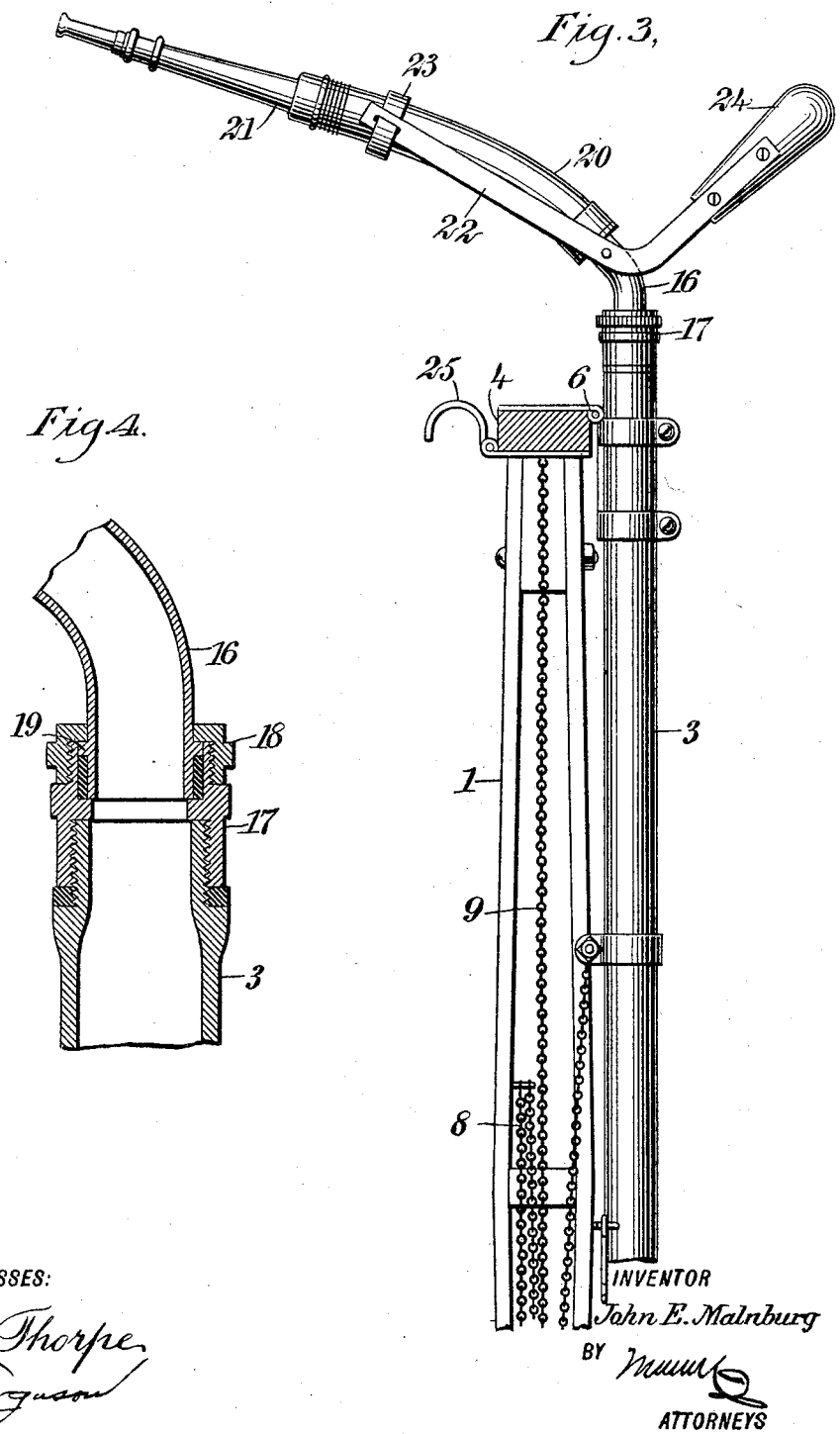

UNITED STATES PATENT OFFICE.

JOHN EDWARD MALNBURG, OF SAN FRANCISCO, CALIFORNIA.

HOSE-SUPPORT.

No. 807,184.  Specification of Letters Patent.  Patented Dec. 12, 1905.

Application filed February 8, 1905. Serial No. 244,747.

*To all whom it may concern:*

Be it known that I, JOHN EDWARD MALNBURG, a citizen of the United States, and a resident of San Francisco, in the county of San Francisco and State of California, have invented a new and Improved Hose-Support, of which the following is a full, clear, and exact description.

This invention relates particularly to improvements in devices for supporting a fire hose or nozzle while discharging water on a fire, the object being to provide a device of this character that will be simple in construction, and that may be easily carried from place to place and folded in small space to be conveniently transported on a truck or other fire apparatus.

Other objects of the invention will appear in the general description.

I will describe a hose-support embodying my invention and then point out the novel features in the appended claims.

Reference is to be had to the accompanying drawings, forming a part of this specification, in which similar characters of reference indicate corresponding parts in all the figures.

Figure 1 is a perspective view of a hose-support embodying my invention. Fig. 2 is a fragmentary view showing the hinge connections between the tripod-head and the legs thereof. Fig. 3 is an elevation of the device, partly in section; and Fig. 4 is a sectional view showing a rotary coupling employed.

The device comprises a tripod having legs 1, 2, and 3, the legs 1 and 2 being hinged to the tripod-head 4, as indicated at 5, while the leg 3 has a hinge connection 6 with said tripod-head. On the upper ends of the legs 1 and 2 are handles 7, by means of which the device may be conveniently carried, and the several legs are prevented from spreading too far apart by means of a chain 8, connecting with the several legs, and when the device is to be secured in place and left to discharge water on a fire it may be anchored by means of a chain 9, attached at one end to the tripod-head and having a screw-eye 10 at the other end to be engaged in a floor or the like. When the apparatus is folded, the legs 1 and 2 may be secured together by means of a hook 11 on one of said legs engaging with an eye 12 on the other leg.

The leg 3 is tubular for conducting water from a line pipe or pipes to the nozzle. This tubular leg 3 is here indicated as having two hose-coupling tubes 13 14, each provided with a suitable valve, and I may also employ in connection with the tubular leg 3 a pressure-gage 15 to indicate the pressure of water thrown upon the fire. A short curved pipe 16 has rotary connection with the upper end of the tubular leg 3.

As clearly indicated in Fig. 4, this curved pipe 16 has its lower end seated in a coupling 17, having screw-thread engagement with the leg 3, and it is held in place by means of a screw-ring 18 engaging with said coupling 17 and having a flange portion for engaging with an annular flange 19 on the pipe 16.

Attached to the pipe 16 is a flexible tube 20, and coupled to this flexible tube 20 is a nozzle 21. Pivoted to opposite sides of the short tube or pipe 16 are arms 22, having portions extending along opposite sides of the flexible pipe 20 and engaged with a collar 23 surrounding said flexible pipe. The outwardly or upwardly extended members of the arms 22 are attached to a handle 24. By manipulating the handle 24 it is obvious that the nozzle may be swung up or down, as desired, and also that the short pipe 16 may be turned in the coupling 17.

In some instances it may be necessary to support the device on a ladder. Therefore I provide a hook 25 for engaging with a rung of the ladder. This hook is shown as having a hinge connection with the tripod-head 4, so that it may be turned underneath the same when the whole apparatus is folded.

It is obvious that a hose-support embodying my invention may be quickly set up in place and firmly anchored should it be necessary to leave the same unattended—that is, in a place where accident might result from a falling wall or where the heat is too intense for a fireman.

While I have described my invention as particularly adapted for use in supporting a fire-hose, it is obvious that it may be employed for supporting a lawn or sprinkling hose.

Having thus described my invention, I claim as new and desire to secure by Letters Patent—

1. A hose-support comprising a folding tripod, one leg thereof being tubular, a hose-coupling on said tubular leg, a short curved pipe having rotary connection with the upper end of the tubular leg, a flexible nozzle-carrying pipe extended from said short pipe, arms pivoted to opposite sides of the short pipe and having portions extended along opposite sides of the flexible pipe and provided with outwardly-extended handle members, and a collar on the flexible pipe with which said arms engage.

2. A hose-support comprising a folding portable tripod, one leg thereof being tubular, a hose-coupling on said tubular leg, a short pipe having rotary connection with the upper end of said tubular leg, a flexible pipe having connection with said short pipe, a nozzle connected to the flexible pipe, and an arm pivoted to said short pipe and having connection with the flexible pipe, said arm being provided with outwardly-extended handle.

In testimony whereof I have signed my name to this specification in the presence of two subscribing witnesses.

JOHN EDWARD MALNBURG.

Witnesses:
ROBERT F. MALNBURG,
WILLIAM J. SPINETTI.